Nov. 21, 1961  F. L. HAUSHALTER  3,009,746
BEARING STRUCTURE
Filed July 20, 1959  3 Sheets-Sheet 1

INVENTOR
FRED L. HAUSHALTER

BY *Whittemore Hulbert & Belknap*
ATTORNEYS

Nov. 21, 1961     F. L. HAUSHALTER     3,009,746
BEARING STRUCTURE
Filed July 20, 1959                              3 Sheets-Sheet 2
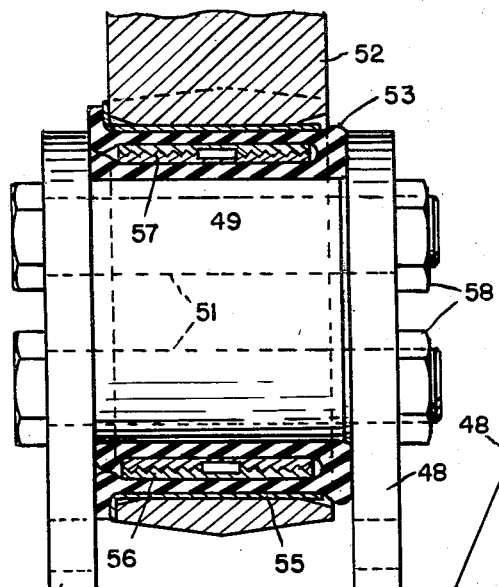
FIG.9.
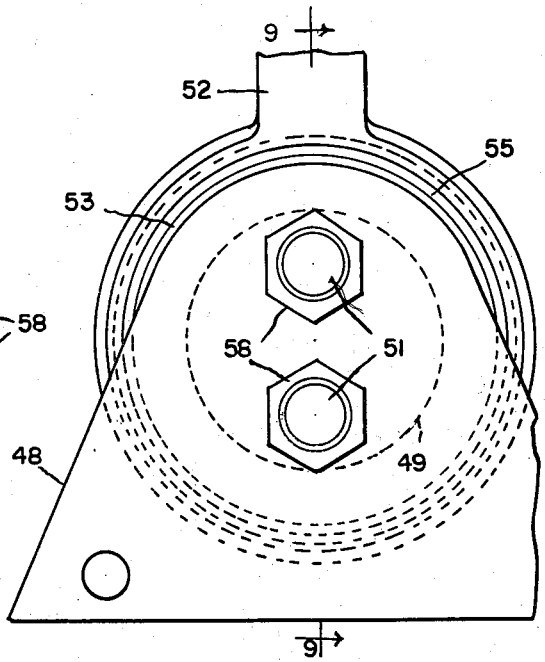
FIG.8.
FIG.11.
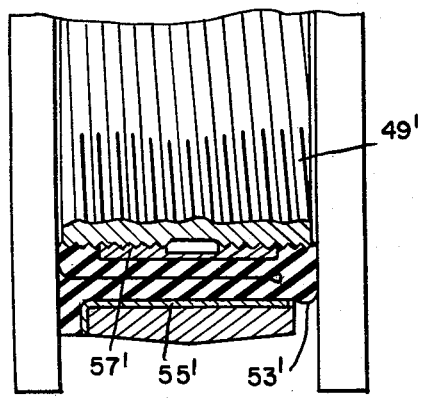
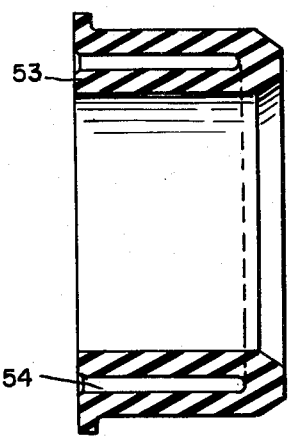
FIG.10.
FIG.12.
INVENTOR
FRED L. HAUSHALTER
BY *Whittemore, Hulbert & Belknap*
ATTORNEYS Nov. 21, 1961 F. L. HAUSHALTER 3,009,746
BEARING STRUCTURE
Filed July 20, 1959 3 Sheets-Sheet 3

INVENTOR
FRED L. HAUSHALTER
BY *Whittemore, Hulbert & Belknap*
ATTORNEYS

United States Patent Office 3,009,746
Patented Nov. 21, 1961

3,009,746
BEARING STRUCTURE
Fred L. Haushalter, 2185 Scott Lake Road,
Pontiac, Mich.
Filed July 20, 1959, Ser. No. 828,212
11 Claims. (Cl. 308—26)

The present invention relates to resilient bushings which are interposed between concentric members having relative rotation with respect to each other. Such bushings as a rule comprise yieldable tubular elements and are usually formed from rubber or similar material and are disposed between and frictionally engage inner and outer radially spaced sleeves. Specifically this invention pertains to threaded bearings with which are associated yieldable bushings.

Threaded bearings are employed where it is desirable to minimize relative lateral or axial displacement of the bearings as well as to provide for efficient lubrication between the relatively rotatable parts.

Threaded bearings have been used in suspension members of automobiles but as employed at present they do not adequately absorb vibrations incidental to road unevenness. There are, of course, connections which employ resilient bushings, but where only the resilient bushing is interposed between relatively rotatable members, to both of which the bushing is frictionally held or bonded thereto, there is considerable torque windup, which windup adds to the spring rate and affects the ride of a low frequency spring. The construction of many modern cars is following the unit body design in which the frame and body are secured to each other or are integral. This latter design poses a problem with respect to isolation of the passenger against road noises and vibrations.

It is one of the objects of this invention to combine the advantages of threaded bearings with yieldable bushings of the type which resist torsional strains as well as axial thrusts.

It is another object of the invention so to assemble the threaded bearings and yieldable bushings that the rubber-like material of the bushings is forced into the space between concentric members to place the material under compression and thus insure intimate frictional contact between the bushing and the concentric members.

It is still another object of the invention to embed in a yieldable bushing relatively rotatable concentric sleeves designed to distribute the torsional strain in the bushing.

Other objects will be apparent from the following description of the invention when taken with the accompanying drawings in which:

FIG. 8 is an elevation of a bracket and radius rod assembly which includes a threaded bearing and resilient bushing;

FIG. 9 is a sectional view taken on line 9—9 of FIG. 8;

FIG. 10 is a sectional view of a resilient bushing in its initial form before its assembly with the radius rod shown in FIG. 9;

FIG. 11 is a partial sectional view of a modified form of bearing and bushing;

FIG. 12 is a sectional view of the bushing used in but prior to the assembly illustrated in FIG. 11;

Figure 14:
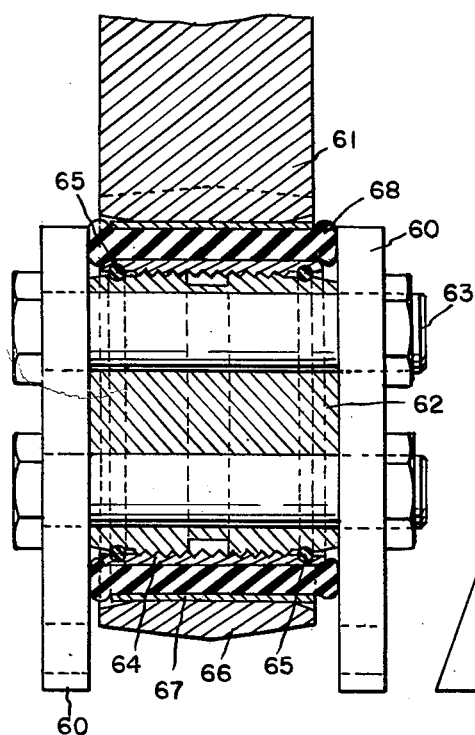
Figure 13:
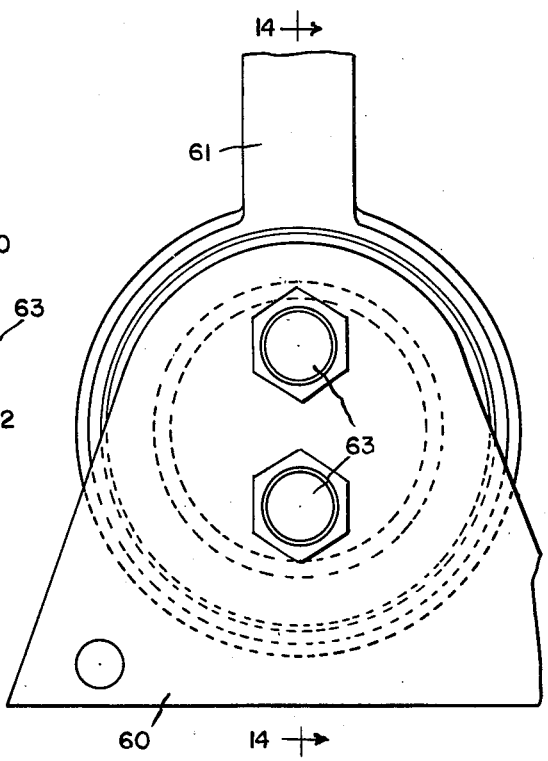
Figure 15:
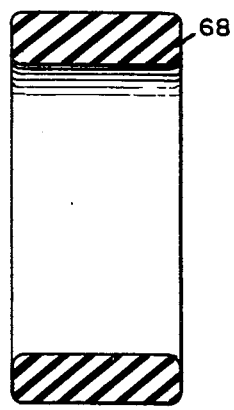

FIGS. 13, 14, and 15 correspond to FIGS. 8, 9, and 10, but illustrate a modification of the radius rod connection shown in those figures.

Figure 1:
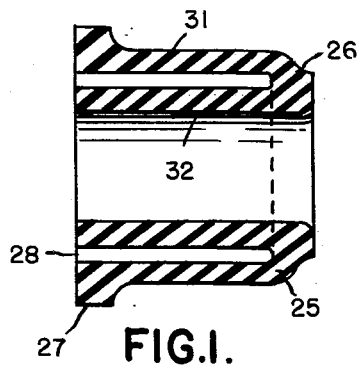
FIG. 1 is a vertical cross-section taken through one form of yieldable bushing before its assembly with relatively rotatable concentric members of the type employed in the present invention.
Figure 2:
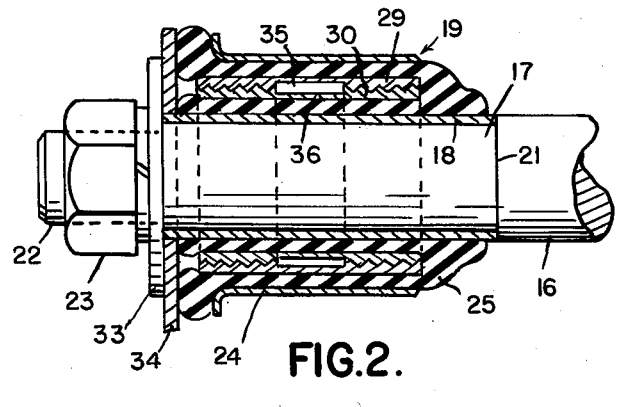
FIG. 2 is a vertical cross-section of an assembly of parts including the bushing shown in FIG. 1.

Referring to FIG. 2 of the drawings, it will be seen that a shaft or bolt 16 has a reduced portion 17 on which there is disposed a metal sleeve 18 forming the inner cylindrical member of a resilient vibration damper assembly indicated generally by the reference character 19. This inner sleeve abuts shoulder 21 on shaft 16, the outer end of the shaft being threaded at 22 to accommodate nut 23, the purpose of which will be explained hereinafter. Interposed between sleeve 18 and an outer concentric metal sleeve 24 is a rubber bushing 25, the initial form of which, before assembly, is shown in FIG. 1. Bushing 25 is reduced at one end 26 and provided with an outwardly radially extending flange 27 at its other end. An axially extending annular recess 28 is open at the flanged end of the bushing but is closed adjacent the reduced end of the bushing.

In FIG. 2 it will be observed that recess 28 accommodates a pair of concentric interfitting threaded sleeves 29, 30, the helical threads of which permit relative rotation between the sleeves but prevent relative axial movement thereof except for the slight displacement resulting from rotation of one sleeve on the other. Sleeves 29, 30 are first assembled by screwing one sleeve on the other, after they are inserted in recess 28. The radial distance between the outer cylindrical surface 31 of the bushing and the inner surface 32 defining the bore which extends through the entire length of the bushing is greater than the radial distance between sleeves 18 and 24. It will, therefore, be appreciated that in order to assemble the resilient bushing with sleeves 18 and 24 it is necessary to insert the bushing between the sleeves by a stretching operation. This is done by employing a suitable tool, preferably sleeve-like, adapted to engage the threaded sleeves and force them axially, along with the rubber bushing, into the space between sleeves 18 and 24. Since the bushing tends to resume its initial form, it will be under compression when the axial pressure forcing it into the position shown in FIG. 2 is relieved. The bushing will then be in intimate frictional engagement with sleeves 18 and 24 as well as with sleeves 29 and 30.

In order to seal the open end of recess 28 and thus prevent the entrance of foreign matter into the threaded bearing formed by sleeves 29 and 30, plates 33, 34 are sleeved on inner sleeve 18 and the threaded end of shaft 16. These plates are forced into intimate engagement with the flanged end of the bushing by tightening nut 23, thus forming an effective seal for that end of the bushing.

It will be noted that sleeves 29, 30 are provided with mating annular grooves 35, 36 which contain the necessary lubricant to minimize friction between the threads of the bearing sleeves. In this form of the invention torque is taken up by the combination of the resilient bushing and the interposed threaded bearing. The windup of the bushing is divided into two spaced portions of the bushing, relative rotation of the inner and outer cylindrical sections of the bushing being permitted by the interposition of the relatively rotatable threaded bearing sleeves. Hence, better absorption of vibration is effected.

Figure 3:
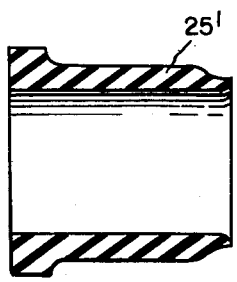
FIG. 3 is a vertical cross-section of another form of yieldable bushing.
Figure 4:
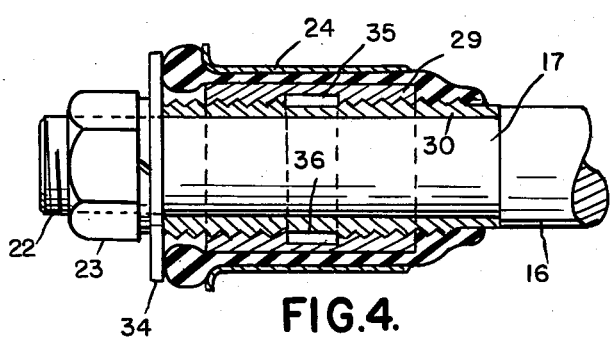
FIG. 4 is a vertical cross-section of an assembly of parts including the bushing shown in FIG. 3.

FIGS. 3 and 4 illustrate another form of the invention in which one of the two sleeves of the threaded bearing is sleeved directly on the reduced portion of the shaft 16.

The rubber bushing 25', the radial thickness of which is greater than the space between sleeves 24 and 29, is forcibly stretched into the space between the interfitting threaded bearing sleeves and outer sleeve 24 and, as in the case of FIG. 2, a plate or washer 34 is pressed against the flanged end of the bushing to seal the damper against entrance of foreign matter.

Figure 5:
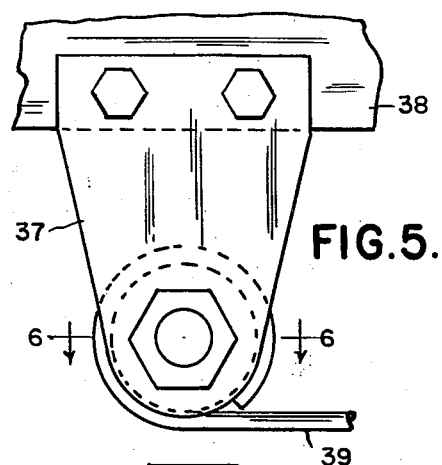
FIG. 5 is a side elevation of a bracket and spring end connection.
Figure 6:
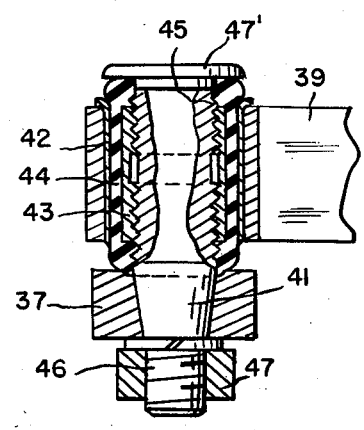
FIG. 6 is a sectional view taken on line 6—6 of FIG. 5.
Figure 7:
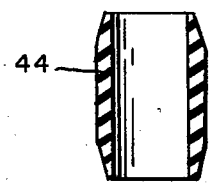
FIG. 7 is a sectional view of the initial form of the resilient bushing shown in FIG. 6.

FIGS. 5, 6, and 7 are illustrative of a further modification of the invention. This form of vibration damper is applied to a spring shackle comprising a bracket 37 depending from frame 38, the curled end of spring leaf 39 being supported therefrom. Interposed between the spring and bolt 41 is a damping structure which includes an outer sleeve 42, inner threaded bearing sleeve 43, and resilient bushing 44. A substantial portion of bolt 41 is threaded at 45 to receive threaded bearing sleeve 43 and is also threaded at 46 to accommodate nut 47. The bolt is provided with a head 47' which bears against one end of bushing 44. The bushing in its initial form is shown in FIG. 7, its ends being tapered and its thickness greater than the space between sleeves 42, 43, so that, when assembled with these sleeves, it is under compression and in intimate engagement with the sleeves. As in other forms of the invention, part of the windup is taken up by the bushing, but some relative rotation between the bolt and the bearing sleeve 43 relieves the bushing of part of the windup. By tightening nut 47 the ends of the bushing are compressed to form an effective seal at the ends of the vibration damper.

FIGS. 8 through 12 show a form of the invention applicable to a vibration damper for radius rod connections. Spaced plates 48 are secured to the frame of a vehicle and a cylindrical block 49 is bolted to and between these plates by bolts 51. The end of radius rod 52 is provided with a circular end portion or journal which encircles block 49. Interposed between the journal end of the radius rod and the block is a resilient bushing 53 similar to that shown in FIG. 1 and having an initial form as shown in FIG. 10. As in other forms of the bushing, an annular recess 54 extends through a substantial length of the bushing, the thickness of the bushing being greater than the space between an outer sleeve 55 which engages the inner surface of the radius rod journal and the bearing block 49. Interfitting threaded bearing sleeves 56, 57 are disposed in recess 54. The bushing is inserted between block 49 and sleeve 55 by a stretching operation, as in the example illustrated in FIG. 1. Nuts 58 provide for drawing plates 48 toward each other to compress the ends of the bushing and thus seal the damper.

The damper shown in FIGS. 11 and 12 differs somewhat from that illustrated in FIGS. 9 and 10 in that the outer periphery of block 49' is threaded to cooperate with threaded bearing sleeve 57'. The radial dimension of recess 54' in bushing 53' is relatively small so that, when the bushing is inserted between sleeves 55' and 57' by stretching, the sides of the recess will be contiguous, as shown in FIG. 11. The windup of the bushings when distorted thus divides the torque between the concentric sections of the bushing. Furthermore, limited relative rotation of threaded sleeve 57' with respect to bearing block 49' relieves some of the strain on the bushing while the latter also absorbs vibration.

FIGS. 13, 14, and 15 illustrate still another modification of a vibration damper associated with a radius rod connection. Plate 60, radius rod 61, bearing block 62, and bolts 63 are similar to like elements of FIG. 11. Threaded bearing sleeve 64 interfits with threaded bearing block 62 and both of these elements are provided adjacent their ends with annular grooves designed to accommodate O-rings 65. The journal portion 66 of the radius rod receives outer sleeve 67 of the damper. Interposed between sleeves 64 and 67 is a resilient bushing 68 comprising a rubber ring which, as shown in FIG. 15, has an initial thickness greater than the space between sleeves 64 and 67. The bushing is forced between the sleeves by stretching and, after assembly, is in intimate engagement with these sleeves. While the O-rings 65 form an effective seal, as a further precaution against foreign materials the plates 60 are drawn toward each other by nuts 69 to compress the ends of bushing 68.

While several modifications of the invention have been illustrated and described, it is to be understood that such changes as are necessary for effecting adequate support of the several members and damping them against noise and vibration are permissible without departing from the broad concept of the invention as defined in the claims.

What is claimed is:

1. A vibration damping structure comprising a fixed cylindrical member, an outer sleeve, said sleeve being concentrically spaced from said member and being relatively rotatable with respect thereto, a tubular resilient element disposed in the space between said member and said outer sleeve, said resilient element being provided with an annular recess closed at one end and open at its other end, a pair of cylindrical threaded bearing sleeves disposed in said space within said recess and thereby embedded in said resilient element, said resilient element being under compression and in intimate engagement with said outer sleeve, said fixed member and said threaded bearing sleeves, and adjustable means for sealing the open end of said recess.

2. A vibration damping structure comprising an outer tubular member, an inner member coaxially within said outer member and cooperating therewith to provide an annular space, a tubular resilient element extending lengthwise of and disposed within said annular space, said resilient element being preformed to provide an annular recess closed at one end of said element and open at the other end thereof, a pair of telescoping bearing sleeves in threaded engagement with each other extending lengthwise of and within said annular space, said bearing sleeves being disposed in said recess and thereby embedded in said resilient element, said resilient element being under compression between said inner and outer members and in intimate pressure engagement therewith and with said bearing sleeves.

3. The structure defined in claim 2 having means for sealing the open end of said recess.

4. A vibration damping structure comprising an outer tubular member, an inner member coaxially within said outer member and cooperating therewith to provide an annular space, a tubular resilient element extending lengthwise of and disposed within said annular space, said resilient element having concentric radially inner and outer wall sections and an annular space between said wall sections, a pair of telescoping bearing sleeves in threaded engagement with each other positioned within said annular space in said resilient element between the wall sections thereof, said resilient element being under compression between said inner and outer members and said bearing sleeves being in intimate pressure contact with the wall sections of said resilient element.

5. A vibration damping structure comprising an outer tubular member, an inner member coaxially within said outer member and cooperating therewith to provide an annular space, one of said members being threaded, a threaded bearing sleeve extending lengthwise of and disposed within said annular space and in threaded engagement with the threaded one of said members, and a tubular resilient element extending lengthwise of and disposed within said annular space between said threaded bearing sleeve and the other of said members, said resilient element being under compression between and in intimate pressure engagement with said threaded bearing sleeve and said other of said members, said resilient element being preformed to provide an annular slot extending axially thereof, the axially extending side walls of said slot being pressed flat against each other when said resilient element is under compression as aforesaid, said slot being open at one end of said element and closed at the other end thereof.

6. The structure defined in claim 5 wherein said inner member is the threaded one of said members.

7. A vibration damping structure comprising an outer tubular member, an inner member coaxially within said outer member and cooperating therewith to provide an annular space, said inner member being externally threaded, a threaded bearing sleeve extending lengthwise of and disposed within said annular space and in threaded engagement with said inner member, and a tubular resilient element extending lengthwise of and disposed within said annular space between said threaded bearing sleeve and said outer member, said resilient element being under compression between and in intimate pressure engagement with said threaded bearing sleeve and said outer member, the opposed surfaces of said threaded bearing sleeve and said inner member having mating circumferential recesses at each end of the threading thereon, and a sealing ring in each pair of mating recesses.

8. The structure defined in claim 7 wherein axially spaced plates are mounted on said inner member beyond said recesses and have annular surfaces respectively in full surface-to-surface engagement with the annular ends of said resilient element.

9. A vibration damping structure comprising an outer tubular member, an inner member coaxially within said outer member and cooperating therewith to provide an annular space, a tubular resilient element extending lengthwise of and disposed within said annular space, said resilient element having concentric radially inner and outer wall sections and an annular space between said wall sections, a pair of telescoping bearing sleeves having circumferentially extending alternate grooves and ridges in mating engagement permitting relative rotation, said bearing sleeves being positioned in the annular space in said resilient element between the wall sections thereof, said resilient element being under compression between said inner and outer members and said bearing sleeves being in intimate pressure contact with the wall sections of said resilient element.

10. A vibration damping structure comprising an outer tubular member, an inner member coaxially within said outer member and cooperating therewith to provide an annular space, a bearing sleeve extending lengthwise of and disposed within said annular space, said bearing sleeve and one of said members having circumferentially extending grooves and ridges in mating engagement permitting relative rotation, and a tubular resilient element extending lengthwise of and disposed within said annular space between said bearing sleeve and the other of said members, said resilient element being under compression between and in intimate pressure engagement with said bearing sleeve and said other of said members, said resilient element being preformed to provide an annular slot extending axially thereof, the axially extending side walls of said slot being pressed flat against each other when said resilient element is under compression as aforesaid, said slot being open at one end of said element and closed at the other end thereof.

11. A vibration damping structure comprising an outer tubular member, an inner member coaxially within said outer member and cooperating therewith to provide an annular space, a bearing sleeve extending lengthwise of and disposed within said annular space, said bearing sleeve and one of said members each having an axial series of circumferentially extending alternate grooves and ridges, the grooves and ridges of said bearing sleeve and the said one of said members being in mating engagement permitting relative rotation, and a tubular resilient element extending lengthwise of and disposed within said annular space between said bearing sleeve and the other of said members, said resilient element being under compression between and in intimate pressure engagement with said bearing sleeve and said other of said members, the opposed surfaces of said bearing sleeve and said one of said members having mating annular recesses at each end of the threading thereon, and a sealing ring in each pair of mating recesses.

References Cited in the file of this patent

UNITED STATES PATENTS

| | | |
|---|---|---|
| 1,939,444 | Geyer | Dec. 12, 1933 |
| 1,991,491 | Calkins et al. | Feb. 19, 1935 |
| 2,103,729 | Leighton | Dec. 28, 1937 |
| 2,892,662 | Scheel | June 30, 1959 |

FOREIGN PATENTS

| | | |
|---|---|---|
| 514,022 | Belgium | Sept. 30, 1952 |